United States Patent Office 3,291,613
Patented Dec. 13, 1966

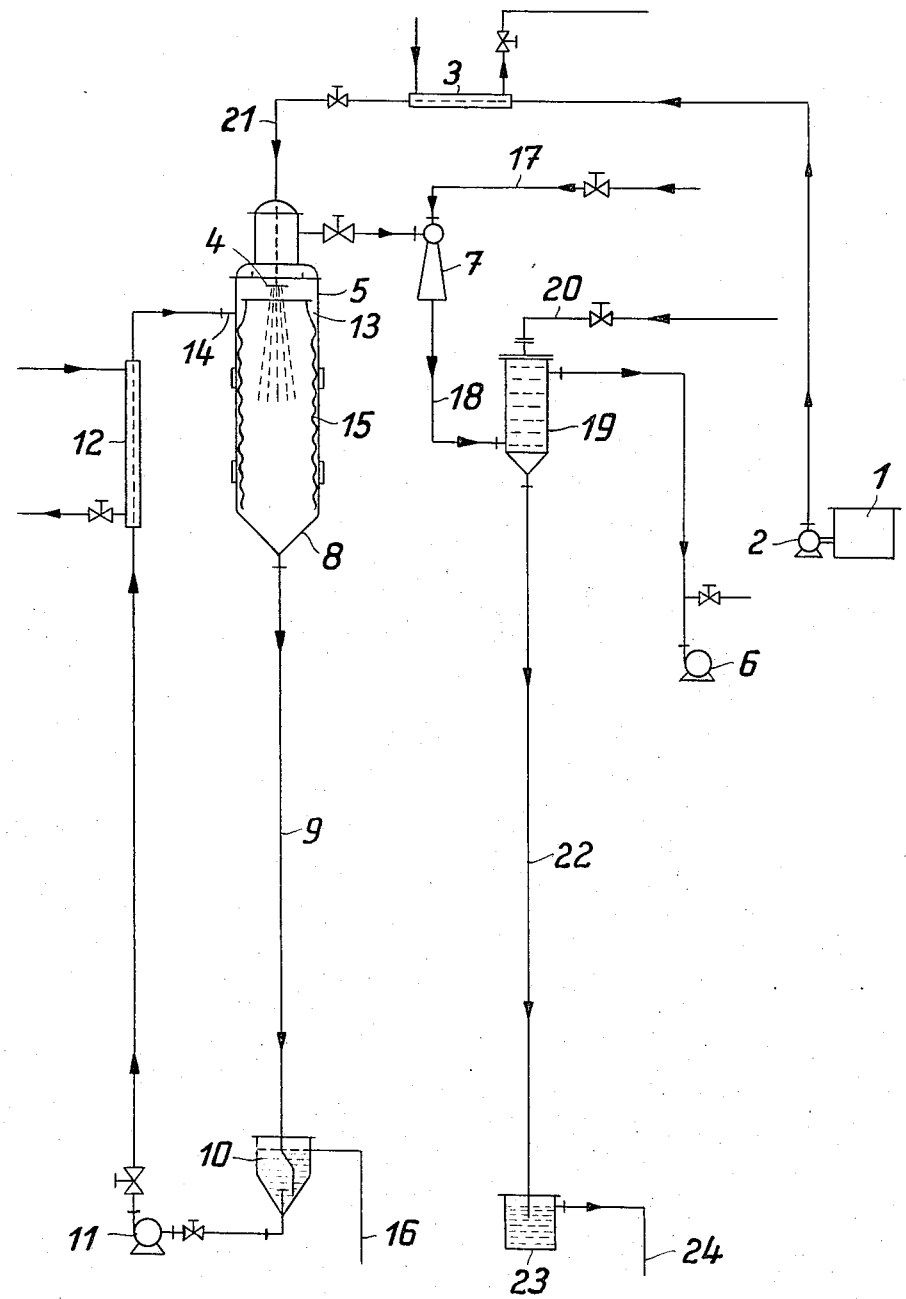

3,291,613
PROCESS FOR THE PRODUCTION OF ALCOHOL-REDUCED BEVERAGES
Karl J. Raible, Munich, Germany, assignor to Aktiengesellschaft fur Brauereiindustrie, Basel, Switzerland
Filed Apr. 22, 1963, Ser. No. 274,432
Claims priority, application Germany, Apr. 21, 1962,
A 40,049
15 Claims. (Cl. 99—33)

This invention relates to a process of manufacturing alcohol-reduced beverages, such as beer, the invention is furthermore directed to a device for carrying out said process.

The general object of the invention is to provide an improved method of treating alcoholic beverages in order to reduce its alcohol content without inducing new and undesired flavor components in the beverage, which components may be formed by locally overheating during the usual heating processes. It is a further object of the invention to provide an improved process in which the heat supply for rendering the energy required is exactly metered and uniformly supplied to the beverage, especially to beer, to only evaporate the alcohol and other highly volatile matter, in a simple, efficient and economical manner, and without overblow from carbon dioxide.

More specifically, it is an object of the invention to provide an improved process of manufacturing alcohol-reduced beverages, in which a charge of said alcoholic beverage is heated for a short time, under increased pressure, then is sprayed into a vacuum, the droplets resulting from the spraying step are collected to form a liquid while said vacuum is drawn off, said collected liquid is heated, and evaporated by applying the vacuum, said steps of heating and vacuum-evaporating being repeated to reduce the volume of liquid, the alcoholic content of said beverage being at least partially evaporated from it to form a concentrate.

A further object is to have said concentrate evaporated to as low as 60–80% of the original volume of said charge of the beverage, said concentrating being performed by repeatedly heating said charge, followed by applying a vacuum to said charge, while the temperature of the charge is not allowed to exceed approximately 80° C., said concentrate being diluted with water, preferably to provide substantially the original dilution of the beverage.

Broadly considered, the invention involves manufacting an alcohol-reduced beverage by subjecting it to a process comprising the steps of short-time heating, under at least atmospheric pressure, a charge of said alcoholic beverage evaporating said heated beverage in a first evaporating step by applying a vacuum to it, collecting the liquid concentrate resulting from said first evaporating step while drawing off said vacuum, re-heating said collected liquid in a process step which is chronologically and physically separated from a second evaporating step consisting of subjecting the heated liquid to a vacuum of between 5 torr and 40 torr, said heating and vacuum-evaporating steps being repeatedly carried through in order to have the volume of said liquid reduced to at least 90% of the original volume, the alcoholic content of said beverage being at the same time at least partially evaporated from it.

Another object of the invention is an improved process of manufacturing alcohol-reduced beverages containing carbonic acid, such as beer, comprising the steps of heating said beer for a short time under increased pressure, said pressure amounting to the partial pressure of the carbon dioxide in said beer, atomizing said pressure-heated beer through at least one spray nozzle into a vacuum, and thereafter, while drawing off said vacuum, collecting said sprayed beer, heating said collected beer and further evaporating said heated beer by applying a vacuum to it, said steps of heating followed by said vacuum-evaporation being repeatedly accomplished to reduce the volume of said beer, the alcoholic content of said beer being at least partially evaporated from it to form a concentrate, said concentrate being diluted with an appropriate amount of water to provide substantially the original dilution of the beer and carbon dioxide.

The invention may more clearly be understood from the following detailed description and the illustration given in the accompanying drawing, which drawing shows a flow sheet of the process of the invention and the device for carrying out this process.

In detail, the process is caried out in such a manner that the beer to be dealcoholized is at first heated under pressure for a short period of time and then immediately sprayed in a vacuum. The pressure during this first heating must lie above the partial pressure of the carbonic acid in the beer in order to avoid a gas release in the heat exchange. The short-time heating procedure is known. It is effected during flow through a platen apparatus. The beer flowing in a thin layer is heated in this operation to the desired temperature in a few seconds especially by means of vapour or hot water, the desired temperature being between about 40 and 80° C. depending upon the period of influence. In this manner, it is guaranteed that the period of time during which the beer subjected to a vacuum distillation is bound to be subjected to an elevated temperature may be restricted to a minimum in order to preclude in this way a new formation of foreign flavour substances. But it is furthermore obtained by the separation of the heat supply and evaporation that the heat is supplied to the beer being distilled absolutely uniformly, that is that each individual beer particle receives the same amount of heat which is necessary to control the distillation. This again offers the possibility of exactly metering the energy supply and rendering it relatively intense, too, whereby the dimensions of the apparatus may be kept within reasonable limits. This mode of operation involves another special advantage in that a formation of froth by releasing the carbon dioxide is largely avoided.

During the vacuum spraying operation, above all, the carbon dioxide and also a part of the alcohol is removed from the beer along with some water without any froth formation occurring in connection with this. This is followed by further vacuum distillation which is carried so far that the beer is concentrated to at least 80–90%, preferably 60–80% of this original volume. The heat energy necessary also for this further evaporation is supplied to the beer at least chiefly by heating it again for a short period of time outside the vacuum evaporator and introducing it anew into the vacuum vessel for further evaporation immediately thereafter. A part of the additional heat may in this operation be supplied also by heating the walls of the vacuum vessel.

During this repeated introduction of the heated beer into the vacuum vessel, the beer loses again a part of its alcohol along with some water and thereby cools again down to temperatures as given by the vacuum employed. This cycle of repeated heating and reintroduction of the heated beer into the vacuum vessel is continued until the desired degree of alcohol withdrawal has been obtained.

The temperature to which the beer is heated for a short period of time prior to the spraying operation and also during the cycle, may be selected ad libitum. It is governed by the operational possibilities and the vacuum employed. Preferably, however, in order to preclude a new formation of flavour substances, 80° C. should not be exceeded.

Likewise, the vacuum employed is governed by the operational possibilities, chiefly because it is desirable that, to relieve the vacuum pump, the alcohol and water mixture distilled off is precipitated in a condenser. Cooling of this condenser may be effected with water from a well. In order that a sufficient condensation effect will occur, the temperature of the alcohol water vapour and with it the vacuum in the evaporator must be correspondingly selected.

Assuming that 150 cal. must be supplied per liter of beer, the process may be carried out for instance as follows: A vacuum of 20 mm. mercury column is generated in the evaporator vessel which corresponds to a vaporizing temperature of about 20° C. Prior to being forced through the nozzles, the beer is heated for a short period of time to a temperature of 70° C. and cools down in the evaporator to a temperature of 20° C. which corresponds to an amount of heat available for evaporation of 50 cal. per liter. This beer which passed through the nozzles must now be heated for a short period of time in a second heating process two more times to a temperature of 70° C. and cooled down again to a temperature of 20° C. in a vacuum so that the totally required 150 cal. will have been supplied. In the case of this example, the alcohol water vapour may be condensed to a considerable degree at a cooling water temperature of 12–15° C. in the condenser.

Of course, other vacuums are possible as well in the vacuum vessel. As a rule, however, it will be recommendable to have the absolute pressure in the vacuum vessel not drop below a value of about 5 torr so as to avoid freezing, and have it not exceed 40 torr otherwise the beer circulating within the evaporator would heat to more than about 30° C. and thus form new flavour substances.

As shown in the drawing, carbonated beer is passed from a tank 1 through a heat exchanger 3 formed in the manner of a flow type platen heater by means of a pump 2 and under a pressure exceeding the partial pressure of the carbonic acid with which the beer is saturated, and is heated in said heat exchanger 3 to a temperature possibly not exceeding 80° C. and preferably lying between 60 and 80° C. From here, the beer flows through conduit 21 to an atomizing nozzle 4 inside a heat insulated vessel 5 subjected to a vacuum.

In this vessel, a desired vacuum is maintained with the aid of a vacuum pump 6 and a steam injector 7. The beer is sprayed within the vessel 5 and thereby loses its carbonic acid without any disturbing froth formation occurring. Simultaneously, it will cool down in correspondence with the vacuum selected so that about ⅓ to ¼ of the energy required for the evaporation of the alcohol and water mixture is supplied during these first process steps. The beer reduced in alcohol collects at the bottom 8 of the vacuum vessel 5 and flows through a stand pipe 9 to an isobarometric and water-tight drop container 10 disposed about 10 m. below. From there it is passed through a heat exchanger 12 likewise formed in the manner of a flow type platen heat exchanger, by means of a pump 11 to be heated anew to a temperature not exceeding a permitted maximum temperature, and then reaches an annular rinsing chamber 13 through a manifold 14, said annular rinsing chamber being disposed inside the vertically arranged vacuum vessel. In the vacuum vessel 5, the beer flows from the annular rinsing chamber 13 and down the cylindrical inner wall 15, thus cooling down again in correspondence with the selected vacuum and losing anew a part of its alcohol and water content. This cycle is continued until the desired degree of dealcoholization is reached. From now on, dealcoholized beer is tapped off from the drop container 10 through the conduit 16 at the same rate as normal beer is fed into the vacuum vessel 5 through the nozzle 4. The output of the entire plant depends, of course, on the temperatures employed. The ratio of the flow through the nozzle 4 to the flow through the annular rinsing chamber 13 is likewise dependent on the temperatures respectively employed in the two heat exchangers 3, 12.

The alcohol and water mixture evaporating during the process as described may be recovered by suitable condensers in front of the steam injector 7 and be worked up again for instance to potable brandy. It is of course also possible to refrain from such recovering operation and discharge the alcohol together with the condensate of the steam injector 7 into the waste water conduit. This is provided in the device which is schematically shown in the drawing. The mixture of water and alcohol steam suctioned from the vacuum vessel by means of the steam injector, together with the working vapour of the steam injector which has been supplied through the line 17, is passed through a line 18 to a condenser 19 to which cooling water is supplied through a line 20 capable of being shut off. The condensate is supplied to the liquid lock of a waterfall container 23 through a stand pipe 22, from where it is discharged through a conduit 24. The waterfall container is disposed 10 m. below the condenser 19. The prevacuum is generated by means of the vacuum air pump 6 already mentioned above prior to switching on the steam injector 7.

In the embodiment shown by way of example, the beer dropping container 10 and the waterfall container 23 are provided to seal the liquids in the vacuum container 5 or the condenser 19, respectively, from atmospheric pressure. Instead of this, pumps may be provided.

In order to avoid oxidizing processes during the dealcoholization operation the process may be carried out as well with living yeast being present at the same time in the circulating system during the entire process. In this case, the yeast is added for instance at the dropping container 10. Thus, oxidation is avoided during the whole of the process of circulation. In addition, reducing reactions are carried through by the simultaneously occurring final fermentation of the residual extract substances. Metabolic products of fermentation formed in this operation and disturbing the smell are immediately removed again by the vacuum distillation. For these reduction processes, apart from yeast, other microorganisms may be used, for instance lactic acid bacteria which are introduced, for instance, as acidified pre-wort if a tartish taste of the final product similar to that of wheat beer is desired.

The process described may be started from a normally matured beer. A special form of the process consists in that no normally matured beer, but a young beer of the fermenting celler, is used in the dealcoholizing process. In this case, one saves the time of storage. In addition, the yeast cells which are still present in the young beer in a suspended state effect the final fermentation during the dealcoholizing process. In addition, oxidizing processes are avoided by the reducing effect of the yeast. The removal of undesired flavour substances from the young beer which is effected during the time of storage of a normal beer by the escaping carbonic acid takes place in this case by the vacuum evaporation.

In this mode of operation, it is of special advantage if instead of the usual bottom-fermented beer, top fermented beers are used for the dealcoholization in a young beer stadium. In the top-fermenting process, higher temperatures are employed so that the enrgy installed in the vacuum distillation is slightly reduced. But the top fermented beers are also specially suitable for the described process for the reason that here the period of fermentation is shorter and thus the utilization of the fermenting cellar is more favourable.

The beer free of carbon dioxide and tapped at the dropping container which is dealcoholized to a more or less extensive degree must at first be brought back to about 95% of the initial volume with the aid of water in order to arrive at a beverage that contains the nonvolatile extract substances in the same concentration as did the originanl beer.

For this, a hop decoction with water or thinned wort may be used to advantage to obtain a special hop flavour. In so doing, it may be of advantage if the liquid to prepare the decoction is adjusted to a pH-value of about 4.5 to 5 prior to boiling, for instance by the addition of a small amount of lactic-acid wort—or permitted—of lactic or citric acid. Subsequently, the beer which has been diluted again, must be newly carbonized. In so doing it will be of advantage to carbonize at first to a higher $CO_2$ content than is intended to be present at the time of tapping of the beer. The beer is at first carbonized to 1% $CO_2$ under a corresponding overpressure and then passed into a storage tank. Here, the bung pressure is slowly decreased so much that it corresponds to a carbonic acid content of 0.5% taking into considertion the temperature. The result is a carbonic acid release in the storage cellar by which a certain removal of disagreeable volatile smelling substances is obtained.

Another possibility of after-treatment consists in that the beer which has been diluted again has yeast added thereto prior to the carbonization and, under certain circumstances, some wort. The addition of wort must, of course, be so small that no substantial amount of alcohol is newly formed by the fermentation. The purpose of this measure is to be seen in the fact that the yeast reverses any changes of the beer caused by oxidation that might perhaps have occurred.

Furthermore, when diluting the beer again, an acidified wort may also be used. The beverage ie thereby endowed with a refreshing flavour which reminds one of the taste of wheat beer. In case a young beer with the total yeast is employed for the vacuum distillation, the yeast may be removed from the young beer prior to spraying the beer in order to avoid difficulties in the spraying nozzle (in particular clogging). Thereupon, the yeast is reintroduced into the beer, for instance, in the dropping container.

If the dealcoholization is carried out in the presence of the total amount of living yeast, an advantageous embodiment of the invention consitss in that the dealcoholized beer containing yeast is heated for a short time to about 60–70° C. prior to its further treatment.

This process is based on the consideration that a 12% wort contains, besides other vitamins, about 500 mg. of vitamin $B_1$ per liter. Said vitamin is absorbed by the yeast during the fermentation process so that it is missing in the finished beer to a considerable extent. If the dealcoholized beer which, however, contains the total amount of yeast, is subjected to a short heating to 60–70° C. prior to the further after treatment, the vitamins leave the yeast cells and enter the beer. Such a beverage is to be recommended especially for children and young people because of the absence of alcohol and the relatively high concentration of vitamin $B_1$.

The beer resulting at the end of all the process steps described which is ready for tapping may at the end still be subjected to a final treatment with absorbing agents, for instance silica gel, bentonite or active coal in order to stabilize the albumen and at the same time finish the flavour.

The fact that the forcing of the beer through nozzles and the evaporation thereof in a thin layer may be carried out in the same vacuum vessel contributes to a reduction in the costs for this processs. Furthermore, the circumstance that young beer may be used to carry out the process, has a cheapening effect on the entire process because in this manner the periods of storage for the finished product are reduced. Finally, it is pointed out that it is a special advantage that the process may be carried out fully continuously.

It will be understood, that modifications and variations may be effected without departing from the scope of the novel concepts of the present invention.

I claim:
1. In a process for manufacturing alcohol-reduced beverages, the steps of heating a charge of an alcoholic beverage for a short time under increased pressure, spraying said pressure-heated beverage into a vacuum, collecting the droplets resulting from said spraying to form a liquid while maintaining said vacuum, heating said collected liquid, and evaporating said heated liquid by applying a vacuum to it, said steps of heating said liquid followed by said vacuum-evaporating being repeated in a discrete and successive manner to reduce the volume and at least partially evaporate the alcoholic content of said beverage.

2. In a process for manufacturing alcohol-reduced beverages, the steps of heating a charge of an alcoholic beverage for a short time under increased pressure, atomizing said pressure-heated beverage through a spray nozzle into a vacuum, collecting the droplets resulting from said spraying to form a liquid while maintaining said vacuum, heating said collected liquid, evaporating said heated liquid by applying a vacuum to it, said steps of heating said liquid followed by said vacuum-evaporating being repeated in a discrete and successive manner to reduce the volume and substantially evaporate the alcoholic content of said liquid to form a concentrate not less than 60% of the original volume of said beverage, and diluting said concentrate with water.

3. In a process for manufacturing alcohol-reduced beverages containing carbonic acid, the steps of heating a beverage for a short time under increased pressure amounting to at least the partial pressure of the carbonic acid in said beverage, spraying said pressure-heated beverage through at least one spray nozzle into a vacuum and thereafter, while maintaining said vacuum, collecting said sprayed beverage, heating said collected beverage, further evaporating said heated beverage by applying a vacuum to it, each of said heating steps being so performed as to not allow the temperature of said beverage to exceed approximately 80° C., said steps of heating followed by vacuum evaporation being repeatedly executed in a discrete and successive manner to reduce the volume and at least partially evaporate the alcoholic content of said beverage to form a concentrate not less than 60% of the original volume of said beverage, diluting said concentrate with an appropriate amount of water to provide substantially the original dilution of the beverage, and adding carbonic acid to said beverage.

4. In a process for manufacturing alcohol-reduced beverages containing carbonic acid, the steps of heating a beverage for a short time under increased pressure amount to the partial pressure of the carbonic acid in said beverage, spraying said pressure-heated beverage through at least one spray nozzle into a vacuum and thereafter, while maintaining said vacuum, collecting said sprayed beverage, heating said collected beverage, further evaporating said heated beverage by applying a vacuum to it, said steps of heating followed by the vacuum-evaporation being repeatedly executed in a discrete and successive manner to reduce the volume and at least partially evaporate the alcoholic content of said beverage to form a concentrate not less than 60% and at most 85–90% of the original volume of the beverage, diluting said concentrate with an appropriate amount of water to provide substantially the original dilution of the beverage, and adding carbonic acid to said beverage.

5. In a process for manufacturing alcohol-reduced beverages containing carbonic acid, the steps of heating a beverage for a short time under increased pressure amounting to at least the partial pressure of the carbonic acid in said beverage, spraying said pressure-heated beverage through at least one spray nozzle into a vacuum and thereafter, while maintaining said vacuum, collecting said sprayed beverage, heating said collected beverage, further evaporating said heated beverage by applying a vacuum to it, said steps of heating followed by vacuum-evaporation being repeatedly executed in a discrete and successive manner to reduce the volume and at least partially evaporate the alcoholic content of said beverage to form a concentrate not less than 60% when compared with the original volume of said beverage, each of said heating steps being so performed as to not allow the temperature of said beverage to exceed approximately 80° C., each of said evaporating steps being so performed as to allow the vacuum to be of the order of between approximately 5 torr and approximately 40 torr, diluting said concentrate with an appropriate amount of water to provide substantially the original dilution of the beverage, and adding carbonic acid to said beverage.

6. In a process for manufacturing alcohol-reduced beverages containing carbonic acid, the steps of heating a beverage for a short time under increased pressure amounting to at least the partial pressure of the carbonic acid in said beverage, spraying said pressure-heated beverage through at least one spray nozzle into a vacuum and thereafter, while maintaining said vacuum, collecting said sprayed beverage, heating said collected beverage, further evaporating said heated beverage by applying a vacuum to it, each of said heating steps being so executed as to allow the temperature of said beverage to amount to about 40–60° C., each of said evaporating steps being executed within a vacuum of about 20 torr, there being provided a slight indirect heating during evaporating by transferring heat through the walls of the apparatus wherein the vacuum is set up, said steps of heating followed by said vacuum-evaporation being repeatedly executed in a discrete and successive manner to reduce the volume and at least partially evaporate the alcoholic content of said beverage to form a concentrate not less than 60% but as low as 60–80% of the original volume of the beverage, diluting said concentrate with an appropriate amount of water to provide substantially the original dilution of the beverage, and adding carbonic acid to said beverage.

7. In a process for manufacturing alcohol-reduced beverages, the steps of heating a charge of said alcoholic beverage for a short time under at least atmospheric pressure, thereafter evaporating said heated beverage in a first evaporating step by applying a vacuum to it, collecting the liquid concentrate resulting from said first evaporating step while maintaining said vacuum, and re-heating said collected liquid in a process step which is chronologically and physically separated from a second evaporating step consisting in subjecting the heated liquid to a vacuum of between 5 torr and 40 torr, said heating steps followed by said vacuum-evaporating steps being repeatedly carried out in order to reduce the volume of said liquid to at least 90% of the original volume, the alcoholic content of said beverage liquid being at the same time at least partially evaporated from it.

8. In a process for manufacturing alcohol-reduced beverages containing carbonic acid, the steps of heating a beverage for a short time under increased pressure amounting to at least the partial pressure of the carbonic acid in said beverage, atomizing said pressure-heated beverage through at least one spray nozzle into a vacuum and thereafter, while maintaining said vacuum, collecting said sprayed beverage, adding living yeast to said collected beverage, heating said collected beverage, further evaporating said heated beverage by applying a vacuum to it, said steps of heating followed by vacuum-evaporation being repeatedly executed in a discrete and successive manner to reduce the volume and at least partially evaporate the alcoholic content of said beverage to form a concentrate not less than 60% of the original volume of said beverage, diluting said concentrate with an appropriate amount of water to provide substantially the original dilution of the beverage, and adding carbonic acid to said beverage.

9. In a process for manufacturing alcohol-reduced beverages containing carbonic acid and living yeast, the steps of heating a beverage for a short time under increased pressure amounting to at least the partial pressure of the carbonic acid in said beverage, atomizing said pressure-heated beverage through at least one spray nozzle into a vacuum and thereafter, while maintaining said vacuum, collecting said sprayed beverage, heating said collected beverage, further evaporating said heated beverage by applying a vacuum to it, said steps of heating followed by the vacuum-evaporation being executed in a discrete and successive manner to reduce the volume and at least partially evaporate the alcoholic content of said beverage to form a concentrate not less than 60% of the original volume of said beverage, diluting said concentrate with an appropriate amount of water to provide substantially the original dilution of the beverage, and adding carbonic acid to said beverage.

10. In a process for manufacturing alcoholic-reduced beverages from a non-matured young beverage containing living yeast cells, the steps of heating a beverage for a short time under increased pressure amounting to at least the partial pressure of the carbonic acid in said beverage, atomizing said pressure-heated beverage through at least one spray nozzle into a vacuum and thereafter, while maintaining said vacuum, collecting said sprayed beverage, heating said collected beverage, further evaporating said heated beverage by applying a vacuum to it, said steps of heating followed by the vacuum-evaporation being repeatedly executed in a discrete and successive manner to reduce the volume and at least partially evaporate the alcoholic content of said beverage to form a concentrate not less than 60% of the original volume of said beverage, diluting said concentrate with an appropriate amount of water to provide substantially the original dilution of the beverage, and adding carbonic acid to said beverage.

11. The process of claim 10, wherein the yeast is separated from said young beverage before spraying said beverage into the vacuum and the yeast is re-added to said sprayed and collected beverage liquid.

12. In a process for manufacturing alcohol-reduced beverages containing carbonic acid, the steps of heating a beverage for a short time under increased pressure exceeding the partial pressure of the carbonic acid contained in said beverage, atomizing said pressure-heated beverage through at least one spray nozzle into a vacuum and thereafter, while maintaining said vacuum, collecting said sprayed beverage, heating said collected beverage, further evaporating said heated beverage by applying a vacuum to it, said steps of heating followed by the vacuum-evaporation being repeatedly executed in a discrete and successive manner to reduce the volume and at least partially evaporate the alcoholic content of said beverage to form a concentrate not less than 60% but as low as 60–80% of the original volume of the beverage, diluting said concentrate with an appropriate amount of a hop decoction and water to provide substantially the original dilution of the beverage, and adding carbonic acid to said beverage.

13. The process of claim 12, wherein said hop decoction is adjusted to a pH-value of about 4.5 to 5.5 prior to boiling.

14. In a process for manufacturing alcohol-reduced beverages containing carbonic acid, the steps of heating a beverage for a short time under increased pressure amounting to at least the partial pressure of the carbonic acid in said beverage, spraying said pressure-heated beverage through at least one spray nozzle into a vacuum and thereafter, while maintaining said vacuum, collecting said sprayed beverage, heating said collected beverage, further evaporating said heated beverage by applying a vacuum to it, said steps of heating followed by the vacuum-evaporation being repeatedly executed in a discrete and successive manner to reduce the volume and at least partially evaporate the alcoholic content of said beverage to form a concentrate not less than 60% but as low as 60–80% of the original volume of the beverage, diluting said concentrate with an appropriate amount of water, adding yeast to said diluted concentrate water to provide substantially the original dilution of the beverage, and adding carbonic acid to said beverage.

15. In a process for manufacturing alcohol-reduced beverages containing carbonic acid, the steps of short-time heating a beverage under increased pressure amounting to at least the partial pressure of the carbonic acid in said beverage, spraying said pressure-heated beverage through at least one spray nozzle into a vacuum and thereafter, while maintaining said vacuum, collecting said sprayed beverage, heating said collected beverage, further evaporating said heated beverage by applying a vacuum to it, said steps of heating followed by the vacuum-evaporation being repeatedly executed in a discrete and successive manner to reduce the volume and at least partially evaporate the alcoholic content of said beverage to form a concentrate not less than 60% of the original volume of said beverage, each of said heating steps being so performed as to not allow the temperature of said beverage to exceed approximately 80° C. and each of said evaporating steps being so performed as to allow the vacuum to be the order of between approximately 5 torr and approximately 40 torr, diluting said concentrate with an appropriate amount of water to provide substantially the original dilution of the beverage, adding carbonic acid to said beverage in such an amount as to impart a $CO_2$ content to said diluted concentrate which exceeds the $CO_2$ content of the original beverage, gradually reducing to the desired value $CO_2$ content of said diluted concentrate by pressure relief accompanied by a corresponding release of carbonic acid, and thereafter discharging said diluted concentrate as the produced alcohol-reduced beverage.

References Cited by the Examiner
UNITED STATES PATENTS

| | | | |
|---|---|---|---|
| 1,426,066 | 8/1922 | Heuser | 99—33 |
| 2,273,853 | 2/1942 | Fischer | 99—31 |
| 2,309,989 | 2/1943 | Saltzman | 99—278 |
| 2,354,093 | 7/1944 | Stein | 99—278 |
| 2,393,518 | 1/1946 | Clarke | 99—31 |
| 2,471,035 | 5/1949 | Hurd | 34—92 |
| 2,969,111 | 1/1961 | Bocograno | 159—48 |
| 3,052,546 | 9/1962 | Riddell et al. | 99—40 |

A. LOUIS MONACELL, *Primary Examiner.*

ABRAHAM H. WINKELSTEIN, *Examiner*

D. M. STEPHENS, *Assistant Examiner.*